(12) United States Patent
Sollars

(10) Patent No.: US 6,327,632 B1
(45) Date of Patent: *Dec. 4, 2001

(54) ADAPTABLE I/O PINS MANIFESTING I/O CHARACTERISTICS RESPONSIVE TO BIT VALUES STORED IN SELECTED ADDRESSABLE STORAGE LOCATIONS, EACH PIN COUPLED TO THREE CORRESPONDING ADDRESSABLE STORAGE LOCATIONS

(75) Inventor: Donald L. Sollars, Milpitas, CA (US)

(73) Assignee: Brecis Communications, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/231,942

(22) Filed: Jan. 14, 1999

Related U.S. Application Data

(63) Continuation of application No. 08/963,346, filed on Nov. 3, 1997, now Pat. No. 5,923,894.

(51) Int. Cl.$^7$ .............. G06F 12/00; G06F 13/00
(52) U.S. Cl. .................. 710/10; 710/8; 710/12; 710/100; 710/104; 710/129; 710/130; 711/154; 326/37
(58) Field of Search .............. 326/37.62, 101; 710/2, 8, 10, 12, 14, 52, 62, 100, 104, 129, 130; 711/100, 154, 200; 712/1, 32, 38, 200

(56) References Cited

U.S. PATENT DOCUMENTS

| | | |
|---|---|---|
| 4,525,780 | 6/1985 | Bratt et al. . |
| 5,168,177 * | 12/1992 | Shankar et al. ............ 307/465 |
| 5,218,707 | 6/1993 | Little et al. . |
| 5,287,490 | 2/1994 | Sites . |
| 5,317,211 * | 5/1994 | Tang et al. ............ 307/465 |
| 5,353,250 * | 10/1994 | McAdams ............ 365/189.03 |
| 5,369,772 | 11/1994 | Tubbs . |
| 5,375,209 | 12/1994 | Maher et al. . |
| 5,404,469 | 4/1995 | Chung et al. . |
| 5,430,862 | 7/1995 | Smith et al. . |
| 5,438,668 | 8/1995 | Coon et al. . |
| 5,477,166 * | 12/1995 | Matthews ............ 326/38 |
| 5,511,182 | 4/1996 | Le et al. . |
| 5,544,092 | 8/1996 | Gunther et al. . |
| 5,557,760 | 9/1996 | Nishii et al. . |
| 5,568,401 | 10/1996 | Narayanaswami . |
| 5,574,873 | 11/1996 | Davidian . |
| 5,574,927 | 11/1996 | Scantlin . |
| 5,724,550 | 3/1998 | Stevens . |
| 5,732,207 * | 3/1998 | Allen et al. ............ 395/182.03 |
| 5,742,802 | 4/1998 | Harter et al. . |
| 5,761,463 * | 6/1998 | Allen ............ 710/129 |
| 5,761,484 | 6/1998 | Agarwal et al. . |
| 5,768,624 | 6/1998 | Ghosh . |
| 6,138,177 * | 10/2000 | Williams et al. ............ 710/8 |
| 6,166,593 * | 12/2000 | Ganzelmi et al. ............ 327/564 |
| 6,247,084 * | 6/2001 | Apostol, Jr. et al. ............ 710/108 |

* cited by examiner

Primary Examiner—Thomas Lee
Assistant Examiner—Tahn Q Nguyen
(74) Attorney, Agent, or Firm—Blakely Sokoloff Taylor & Zafman

(57) ABSTRACT

A pin control unit and a plurality of addressable storage locations are provided to an integrated circuit to control the input/output (I/O) pins of a functional block of the integrated circuit or the I/O pins of the integrated circuit. Multiple ones of the addressable storage locations are correspondingly coupled to I/O buffers associated with the I/O pins. The pin control unit selectively loads bit values into appropriate ones of the addressable storage locations. In response, the I/O buffers input bit values from and/or output bit values to the corresponding I/O pins. The pin control unit controls subsets of the I/O pins in a coordinated manner as I/O ports. The pin control unit also controls data movement between the addressable storage locations and various temporary storage elements of the functional block/integrated circuit.

19 Claims, 9 Drawing Sheets

ADAPTABLE I/O PINS MANIFESTING I/O CHARACTERISTICS RESPONSIVE TO BIT VALUES STORED IN SELECTED ADDRESSABLE STORAGE LOCATIONS, EACH PIN COUPLED TO THREE CORRESPONDING ADDRESSABLE STORAGE LOCATIONS

RELATED APPLICATION

This is a continuation of application Ser. No. 08/963,346, filed on Nov. 3, 1997 and issued as U.S. Pat. No. 5,923,894.

BACKGROUND OF THE INVENTION

1. Field of the Invention

The present invention relates to the field of integrated circuits. More specifically, the present invention relates to the art of controlling input/output (I/O) of an integrated circuit, which applies equally to controlling I/O of a functional block of an integrated circuit of an embedded design type.

2. Background Information

All integrated circuits (or chips) have I/O pins to facilitate input and output of data values. Typically, the functional purposes of the I/O pins of a chip are defined, and combinatorial logic are employed to effectuate the functional behavior of the I/O pins. This prior art approach of employing combinatorial logic to control the I/O pins of a chip suffers from a number of disadvantages, including:

1. a large portion of the real estate of the chip being taken up by the I/O pin control combinatorial logic, and
2. the combinatorial logic must be redesigned for those I/O pins redefined with different functional purposes for different variants of the chip.

Thus, a more flexible or adaptable approach to controlling I/O of a chip is desired.

The above description including the disadvantages applies equally to functional blocks of integrated circuits that are of the embedded design type, where the functional blocks are inter-coupled by coupling the I/O signals of the functional blocks to on-chip buses, as if the functional blocks are physically different chips and the I/O signal lines are "I/O pins". Thus, a more flexible or adaptable approach to controlling I/O of a functional block of a chip is also desired.

As will be disclosed in more detail below, the present invention provides a more flexible and adaptable approach as desired. From the description to follow, these and other advantages will be apparent to those skilled in the art. In the description to follow, the term "I/O pin" is intended to include the emerging usage and meaning of the term, i.e. internal interface signal lines that are configured and managed as if they are external interface signal lines, as well as the historical usage and meaning of the term.

SUMMARY OF THE INVENTION

A pin control unit and a plurality of addressable storage locations are provided to an integrated circuit to control either the I/O pins of a functional block of the integrated circuit or the I/O pins of the integrated circuit. Multiple ones of the addressable storage locations are correspondingly coupled to I/O buffers associated with the I/O pins. The pin control unit selectively loads bit values into appropriate ones of the addressable storage locations. In response, the I/O buffers input bit values from and/or output bit values to the corresponding I/O pins.

In one embodiment, three addressable storage locations are employed for each I/O pin, one for the associated input buffer, and two for the pull-up and pull-down devices of the associated output buffer. Additionally, the pin control unit controls various subsets of the I/O pins in a coordinated manner to operate them as I/O ports. A port bus is provided for each I/O port to supply output data values to the addressable storage locations provided, and each I/O port is provided with a port register. The I/O port register and various temporary storage elements are coupled to the port buses to facilitate data movement between these elements and the I/O ports.

In one embodiment where the "external" bus is a multiplexed address/data bus, the pin control unit employs a pair of I/O ports to output an instruction fetch address, and one of the pair of I/O ports to receive the instruction fetched. Additionally, the pin control unit employs the pair of the I/O ports to output and input data values. The pin control unit also employs the pair of the I/O ports to perform general purpose I/O in a manner that is compliant with particular architectural requirements.

In one embodiment, the addressable storage locations provided for the input and output buffers associated with the I/O pins, the I/O port registers and various temporary storage elements are all disposed in a common storage structure. In one embodiment, the common storage structure is a cache memory.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. Those skilled in the art will also appreciate that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Figure 1:
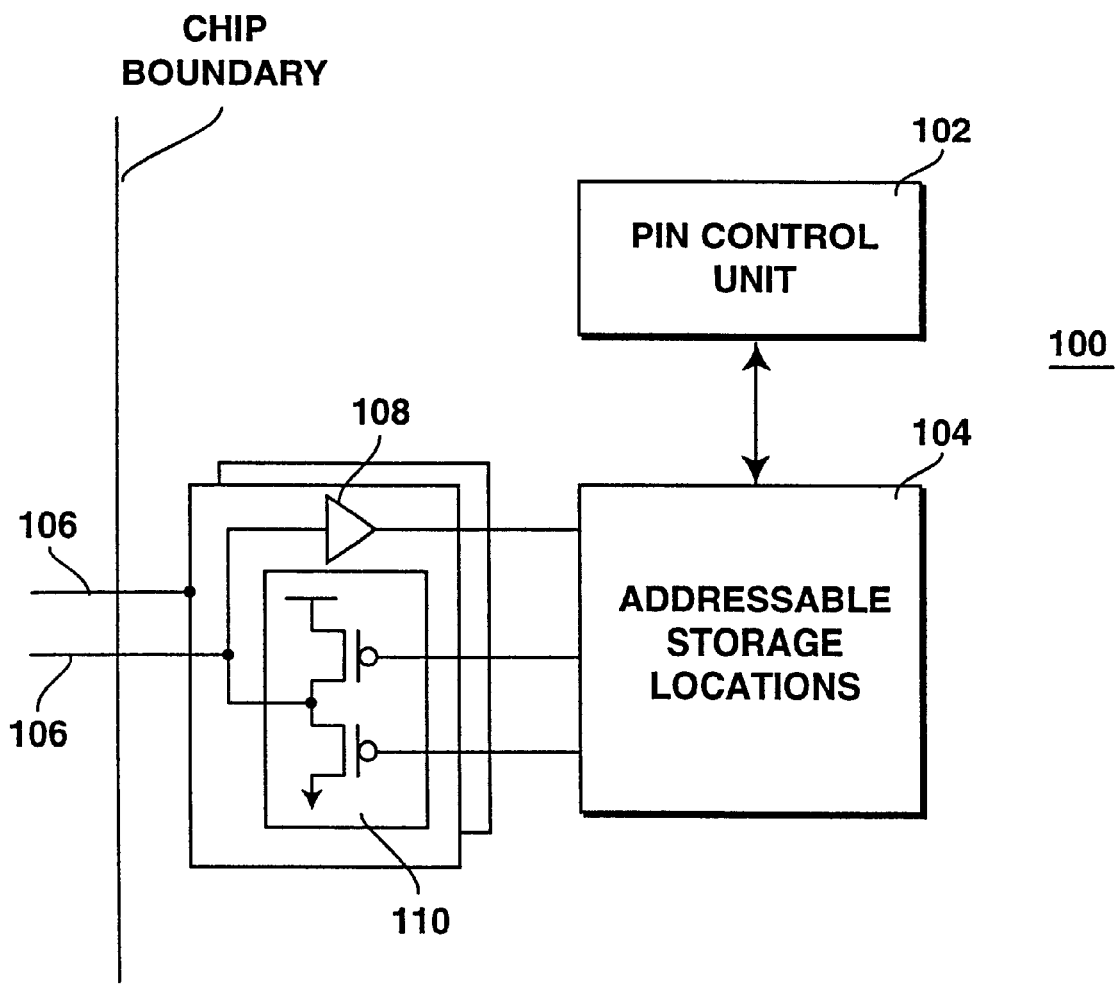
FIG. 1 illustrates one embodiment of an exemplary integrated circuit incorporated with the teachings of the present invention.

Referring now to FIG. 1, wherein a block diagram illustrating one embodiment of an integrated circuit incorporated with the teachings of the present invention is shown. As illustrated, in accordance with the teachings of the present invention, in lieu of conventional dedicated combinatorial logic, exemplary integrated circuit 100 is provided with pin control unit 102 and a number of addressable storage locations 104 to control I/O pins 106. For the illustrated embodiment, I/O pins 106 are conventional I/O pins disposed at the chip boundary of integrated circuit 100. As will be apparent from the description to follow, the present invention may also be practiced with I/O pins 106 disposed at internal block boundaries of integrated circuit 100, i.e. I/O pins 106 being I/O signal lines of a functional block of integrated circuit 100 that interface to an on-chip bus as if they are I/O "pins".

As will be described in more details below, multiple ones of addressable storage locations 104 are correspondingly coupled to I/O buffers 108 and 110 associated with I/O pins 106, to facilitate control of I/O pins 106 by pin control unit 102. Pin control unit 102 effectuates control of I/O pins 106 by selectively loading bit values into appropriate ones of addressable storage locations 104. In response to the loaded bit values, I/O buffers 108 and 110 input bit values from and/or output bit values to corresponding I/O pins 106. As a result, I/O pins 106 are flexibly managed by pin control unit 102 (as opposed to being dedicated to any specific hardware resource), the amount of real estate of integrated circuit 100 consumed for controlling I/O pins 106 is reduced, and alteration of the functional characteristics of I/O pins 106 can be effectuated more easily between variants of integrated circuit 100 by modifying pin control unit 102. For example, pin control unit 102 can be designed to support one bus protocol in one variant of integrated circuit 100, such as a multiplexed address/bus protocol, and easily modified to support another bus protocol in another variant of integrated circuit 100, such as a de-multiplexed parallel address and bus protocol.

Addressable storage locations 104, input and output buffers 108 and 110, as well as I/O pins 106 are intended to represent a broad category of these elements known in the art. The operating logic of pin control unit 102 will be described in more details below. As will be readily apparent from the description to follow, pin control unit 102 may be implemented strictly in hardware or in hardware and software combination, using any number of circuitry and programming techniques known in the art.

It should be noted that while for the illustrated embodiment, only one pin control unit 102 is employed, and employment of a singular pin control unit 102 is presently preferred, nevertheless, the present invention may be practiced employing more than one pin control unit 102 without sacrificing all the advantages of the present invention. Accordingly, except for the innovative employment of pin control unit 102 and addressable storage locations 104 to control I/O pins 106, integrated circuit 100 may be any one of a broad range of integrated circuits, including in particular processors or integrated circuit designs with embedded processors. The term processor as used herein is intended to include micro-controllers (MCU), digital signal processors (DSP), general purpose microprocessors (uP), and the like.

Figure 2A:
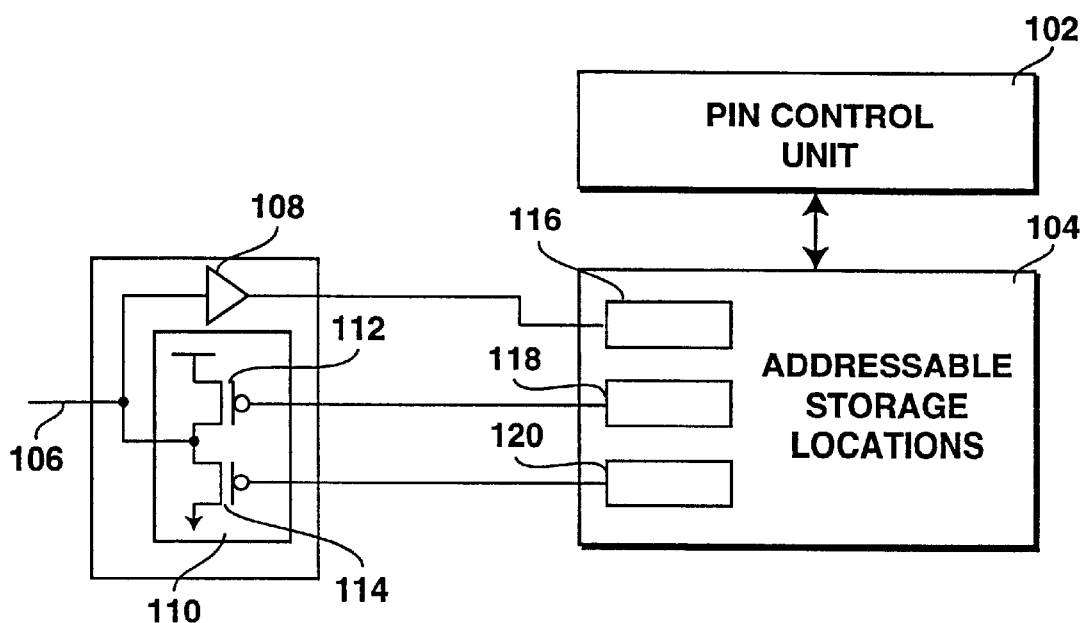
FIGS. 2a–2b illustrate the employment of addressable storage locations for the I/O buffers associated with the I/O pins in further detail.

FIG. 2a illustrates the usage of addressable storage locations 104 in further detail, in accordance with one embodiment of the present invention. For the illustrated embodiment, three addressable storage locations 116–120 of addressable storage locations 104 are employed for each I/O pin 106, one addressable storage location 116 for associated input buffer 108, and two addressable storage locations 118–120 for associated output buffer 110, more specifically, pull-up and pull-down devices 112 and 114 of associated output buffer 110. Addressable storage locations 116–120 are correspondingly and directly coupled to input buffer 108 and pull-up and pull-down devices 112–114 of output buffer 110.

To output a data bit, pin control unit 102 writes the data bit into both addressable storage locations 118 and 120 for pull-up and pull-down devices 112 and 114 of associated output buffer 110 of I/O pin 106. To input a data bit, pin control unit 102 writes control bits into the same two addressable storage locations 118–120 to simultaneously disable pull-up and pull-down devices 112–114 of associated output buffer 110 of I/O pin 106, and enable the associated input buffer 108 of I/O pin 106 to provide the input data bit to addressable storage location 116.

In one embodiment, pull-up device 112 is enabled responsive to an active low signal, and disabled responsive to a high signal, whereas pull-down device 114 is enabled responsive to an active high signal, and disabled responsive to a low signal. For this embodiment, pin control unit 102 writes a "1" and a "0" into addressable storage locations 118 and 120 respectively, to simultaneously disable pull-up and pull-down devices 112 and 114, and enable input through input buffer 108.

Figure 2B:
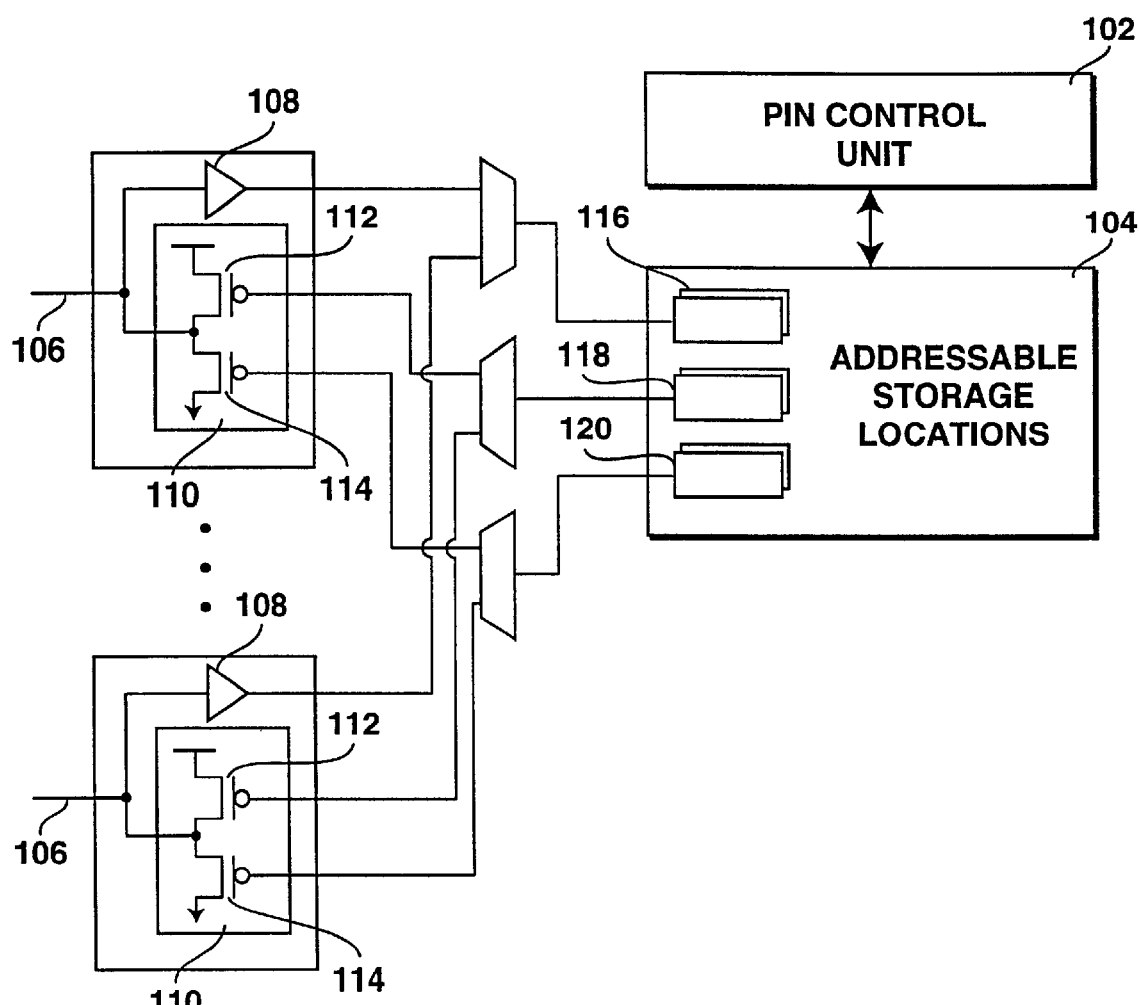

FIG. 2b illustrates an alternative embodiment for coupling addressable storage locations 116–120 to input buffer 108 and pull-up and pull-down devices 112–114 of output buffer 110 associated with I/O pin 106. In this alternate embodiment, inputs from input buffers 108 associated with multiple I/O pins 106 are multiplexed to their corresponding addressable storage locations 116 using one or more multiplexors 121, whereas outputs from addressable storage locations 118–120 are de-mutiplexed to pull-up and pull-down devices 112 and 114 of output buffers 110 associated with multiple I/O pins 106 using one or more de-multiplexors 123. Other alternative embodiments may also be employed.

Figure 3:
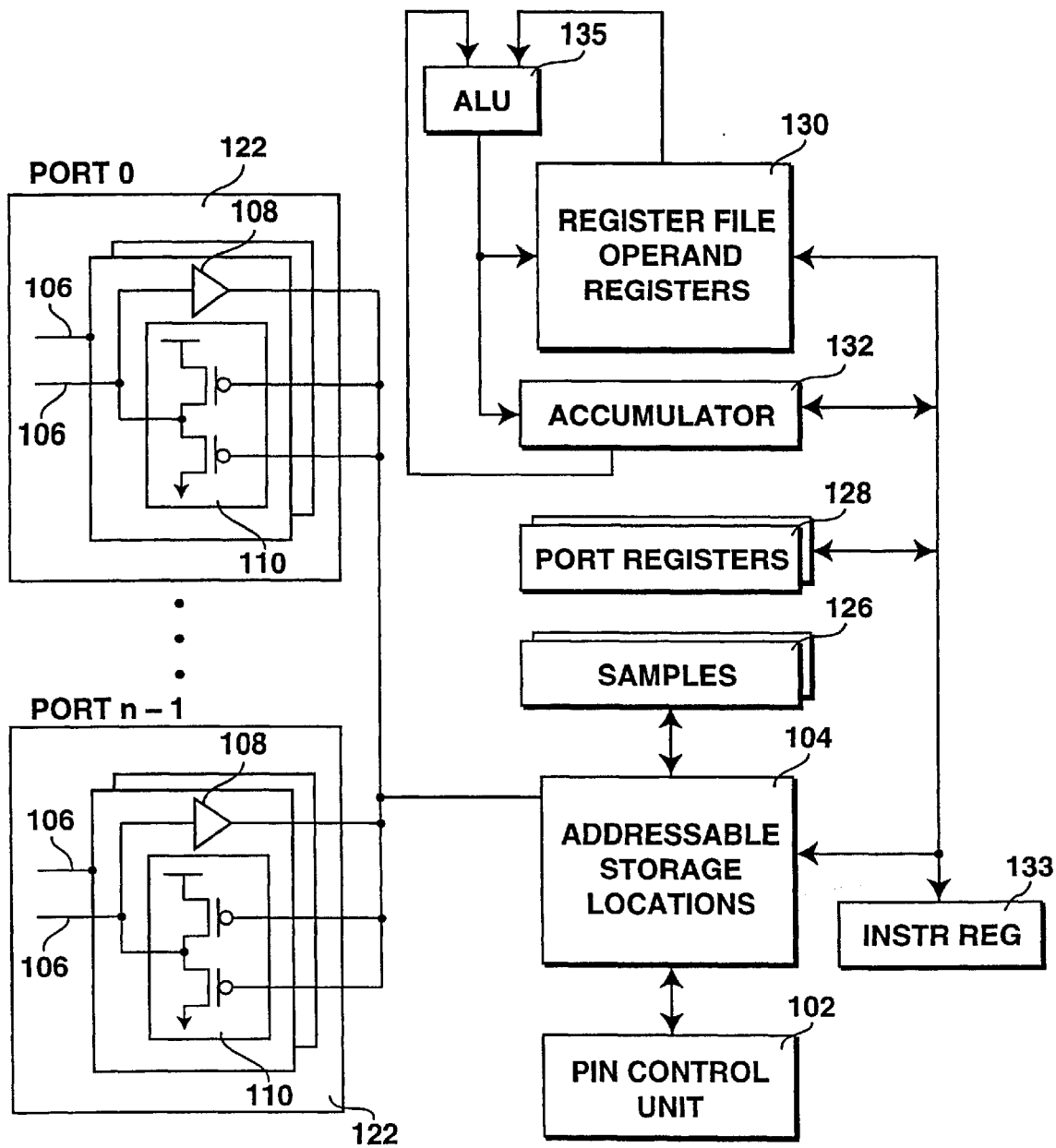
FIG. 3 illustrates a logical organization of the I/O pins.

FIG. 3 illustrates a logical organization of I/O pins 106 in accordance with one embodiment of the present invention. As shown, for the illustrated embodiment, pin control unit 102 controls various subsets of I/O pins 106 in a coordinated manner to operate the various subsets of I/O pins 106 as I/O ports 122. For example, eight I/O pins 106 may be operated together in a coordinated manner as a bi-directional I/O port 122 for inputting or outputting a byte of data at a time. Two I/O ports 122 may be operated together to output for example a 16 bit address.

For the illustrated embodiment, a port bus 124 is provided for each I/O port 122 to couple the I/O port 122 to various temporary storage elements of integrated circuit 100 to supply output data values to addressable storage locations 118 and 120 provided for pull-up and pull-down devices 112 and 114 of the associated output buffers 110 of I/O pins 106 of the I/O port 122, and to receive input data values from addressable storage locations 116 provided for input buffers 108 of I/O pins 106 of the I/O port 122. For the illustrated embodiment, the temporary storage elements include operand registers 130 and accumulator 132 of integrated circuit 100 that operate to supply the output data to addressable storage locations 118 and 120, and to receive input data from addressable storage location 116. Operand registers 130 and accumulator 132 are also coupled to ALU 135. In like manner, instruction buffer 133 is also coupled to selected ones of port buses 124 to receive fetched instructions from addressable storage locations 116.

For the illustrated embodiment, an addressable storage location 126 is also provided to complement each addressable storage location 116 corresponding to the input buffer 108 of an associated I/O pin 106, to store a sampled version of the input data bit stored in the corresponding addressable storage location 116. Additionally, a port register 128 is provided for each I/O port 122. Port registers 128 are also correspondingly coupled to port buses 124.

In one embodiment, addressable storage locations 104, addressable storage locations 126, port registers 128, operand registers 130, accumulator 132 and instruction register 133 are all disposed in a common physical storage structure. In one embodiment, the common physical storage structure is a cache memory. In one embodiment, the cache memory is further provided with a special port (p-port) to load values into addressable storage locations 104 associated with controlling I/O pins 106.

Thus, under the present invention, data movement between I/O pins 106 and temporary storage elements of integrated circuit 100 can be easily and efficiently accomplished. In particular, ALU 135 can write to any one of I/O pins 106 easily by way of accumulator 132. No intermediate registers are necessary to input data values from I/O pins 106 to accumulator 132 or output data values from accumulator 132 to I/O pins 106. Similarly, input and output data values can be moved easily between operand registers 130 and I/O pins 106. Of special importance is the fact, under the present invention, instructions can directly control the behavior of an I/O port, making it relatively easily to cause I/O ports 122 to behave in conformance to any one of a number instruction set architecture (ISA).

Figure 4:
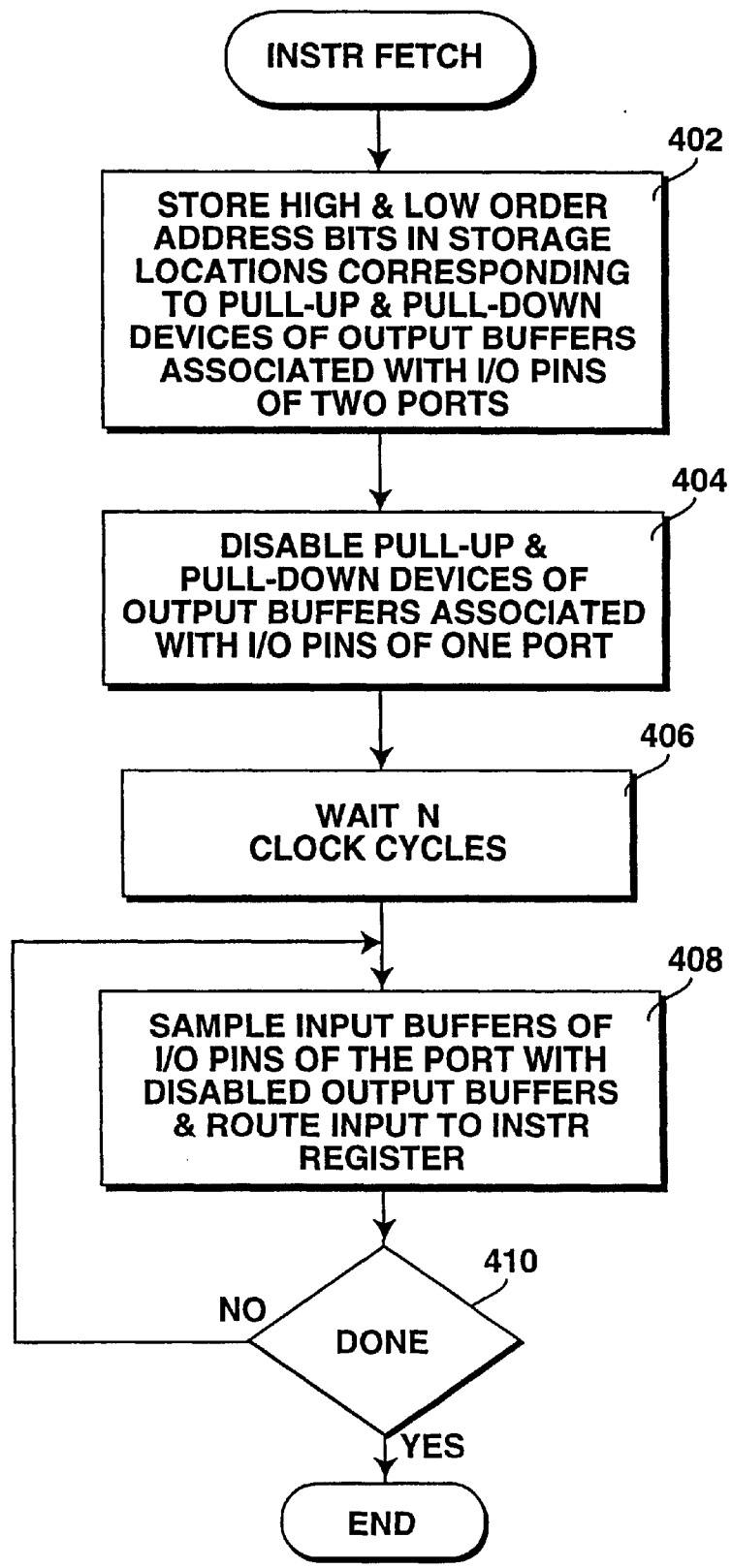
FIG. 4 illustrates one embodiment of the operational steps of pin control unit for controlling a number of I/O pins to fetch an instruction.

FIG. 4 illustrates one embodiment of the operational steps of pin control unit for controlling a number of the input/output (I/O) pins to fetch an instruction, e.g. from an external memory. The illustration is presented in the context of the "external" bus coupled to I/O pins being a multiplexed address/data bus, where the data size is half the address size. At step 402, pin control unit causes the lower order address bit values to be stored in the addressable storage locations corresponding to the pull-up and pull-down devices of the output buffers associated with the I/O pins of one of the I/O ports, and the higher order address bit values to be stored in the addressable storage locations corresponding to the pull-up and pull-down devices of the output buffers associated with the I/O pins of another one of the I/O ports. As described earlier, in response, the output buffers associated with the I/O pins of the I/O ports output the lower and the higher order address bits. At step 404, pin control unit causes a pair of control bit values to be stored in the addressable storage locations corresponding to the output buffers associated with the I/O pins of a predetermined one of the two I/O ports, to disable the pull-up and pull-down devices of the output buffers associated with the I/O pins of the predetermined one of the two I/O ports, and enable the input buffers associated with the I/O pins of the predetermined one of the two I/O ports to input the instruction being fetched.

At step 406, pin control unit waits a predetermined number of clock cycle. At step 408, pin control unit starts causing the input values stored in the addressable storage locations corresponding to the input buffers associated with the I/O pins of the predetermined one of the I/O ports to be sampled and routed to an instruction buffer, to accept the instruction being returned. Step 408 is repeated until the entire instruction has been received.

In an alternate embodiment, the "external" bus is a de-multiplexed fully parallel address and data bus. The "external" bus is coupled to three I/O ports, two for address and one for data. For this embodiment, step 404 may be skipped, i.e. the simultaneous disabling of pull-up and pull-down devices 112–114 of output buffers 110 associated with I/O pins 106 of one of the address ports is no longer necessary. In yet another embodiment, the "external" bus is a highly multiplexed address and data bus coupled to one I/O port, where the high and lower order bits of an address and the data are to driven in sequence. For this embodiment, step 402 will have to be performed in two parts. In general, any one of a number of "external" buses of various protocols and address/data sizes may be employed.

Figure 5:
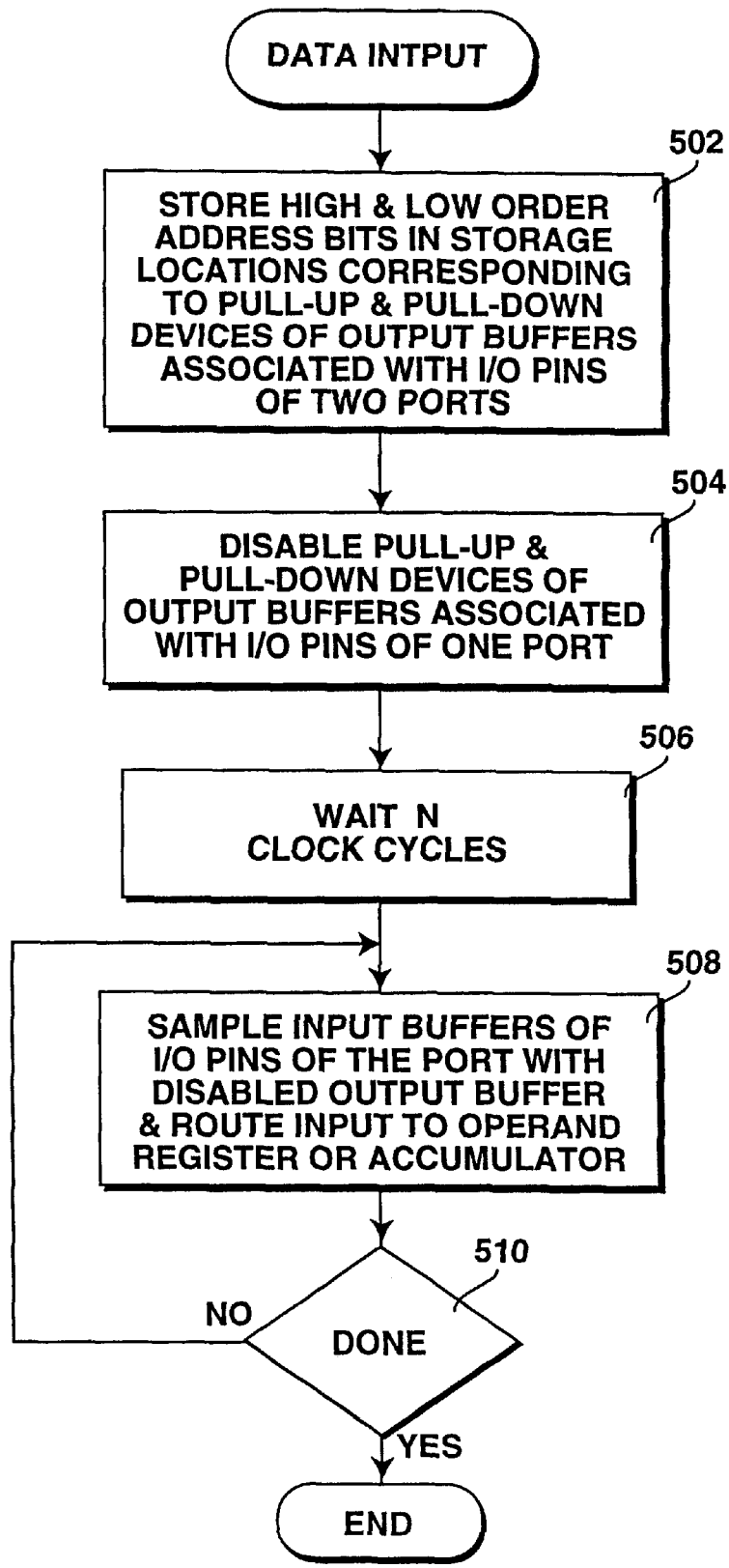
FIGS. 5–6 illustrate one embodiment each of the operational steps of pin control unit for controlling a number of I/O pins to input and output data values.
Figure 6:
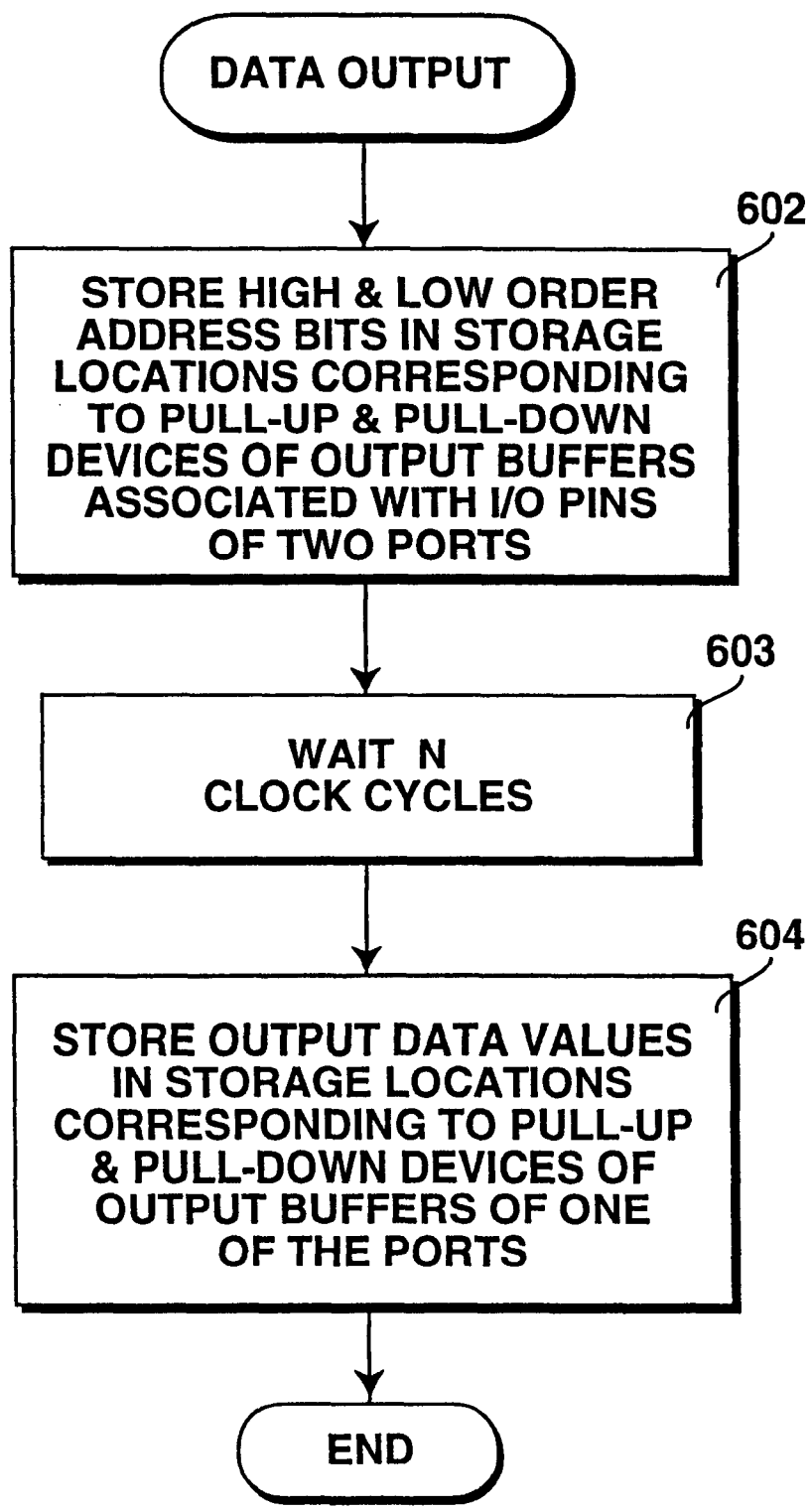

FIGS. 5 and 6 illustrate one embodiment each of the operational steps of pin control unit for controlling a number of the input/output (I/O) pins to input and output a data value respectively, e.g. from/to an external memory. Similarly, for this illustration, the description is given in the context of a multiplexed address/data bus, where the data size is half the address size. Each of steps 502 and 602 is basically the same as step 402. In the case of inputting a data value, steps 504 and 506 are basically the same as steps 404 and 406, whereas step 508 is similar to step 408, except for the fact that the sampled input data are routed to either an operand register or the accumulator instead. In the case of outputting a data value, upon performing step 602, at step 604, pin control unit causes the output data value to be stored in the addressable storage locations corresponding to the output buffers associated with the I/O pins of a predetermined one of the two I/O ports. As described earlier, in response, the output buffers associated with the I/O pins of the I/O port output the output data value.

Likewise, in an alternate embodiment, the "external" bus may be a de-multiplexed fully parallel address and data bus. The "external" bus is coupled to three I/O ports, two for address and one for data. For this embodiment, steps 504, the simultaneous disabling step may be skipped, whereas step 604 is performed against a data port, as opposed to one of the address ports. Similarly, in yet another embodiment, the "external" bus is a highly multiplexed address and data bus coupled to one I/O port, where the high and lower order bits of an address and the data are to driven in sequence. For this embodiment, steps 502 and 602 will have to be performed in two parts. In general, any one of a number of "external" buses of various protocols and address/data sizes may also be employed.

Figure 7:
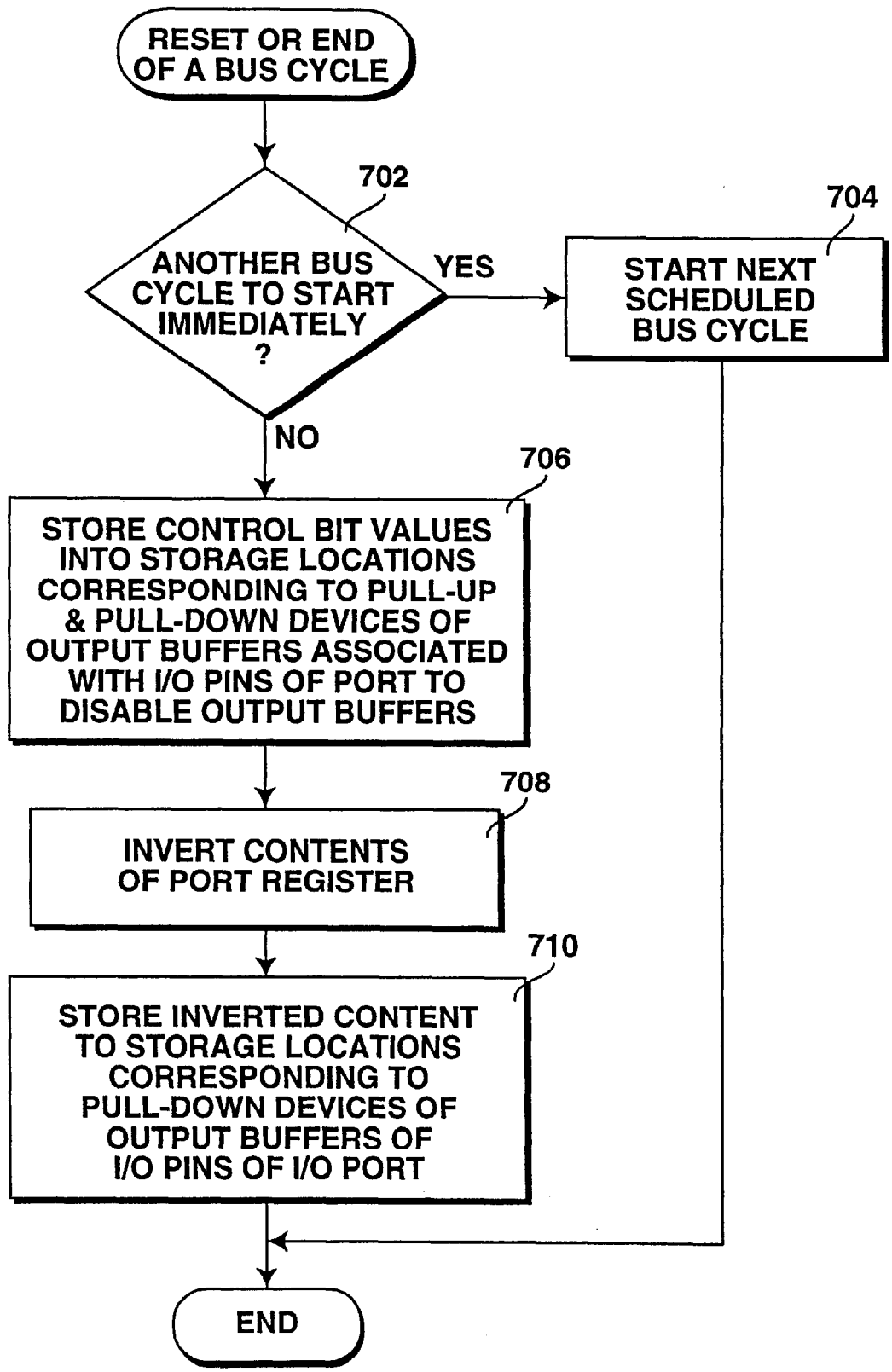
FIGS. 7–8 illustrate one embodiment each of the operational steps of pin control unit for controlling a number of I/O pins to perform general purpose I/O, and at the same time, meeting certain architectural requirements.

FIG. 7 illustrates one embodiment of the operational steps of pin control unit for controlling a number of the input/output (I/O) pins to perform general purpose I/O and presenting the particular I/O pins as open drains, in compliant with a particular architectural requirement. As shown, at step 702, at reset or at the end of a bus cycle, pin control unit determines if a subsequent bus cycle is scheduled to begin immediately. If a subsequent bus cycle is scheduled to begin immediately, pin control unit causes the scheduled bus cycle to begin, step 704, e.g. performing the steps of FIGS. 4, 5 or 6. On the other hand, if a subsequent bus cycle is not scheduled to begin immediately, pin control unit causes a pair of control bit values to be stored into the addressable storage locations corresponding to the pull-up and pull-down devices of the output buffers associated with the I/O pins of the I/O, to simultaneously disable the pull-up and the pull-down devices, step 706. Next, pin control unit causes the contents of the port register corresponding to the I/O pins of the I/O port to be inverted, step 708 and then stored into the addressable storage locations corresponding to the pull-down devices of the output buffers associated with the I/O pins of the I/O port, step 710.

Figure 8:
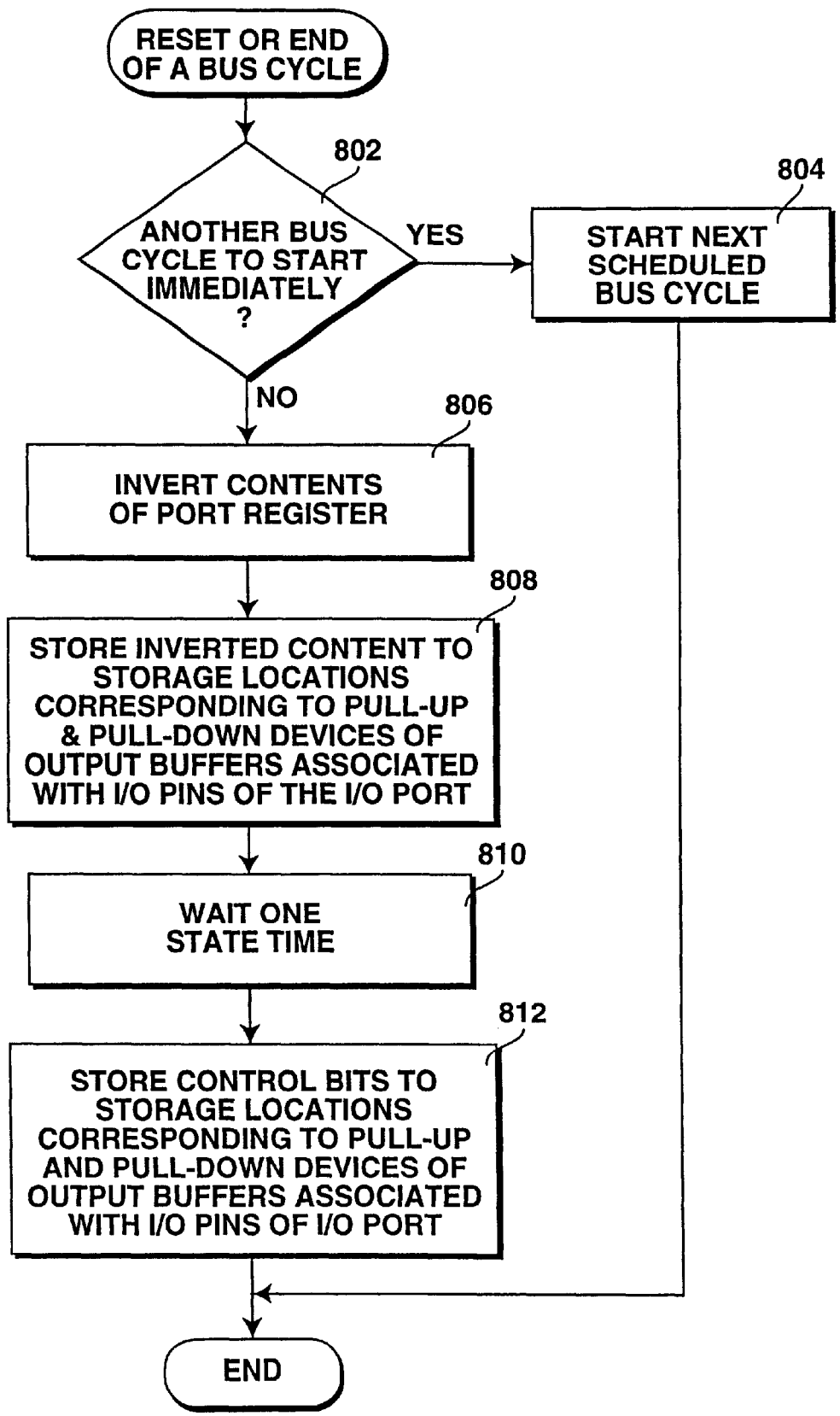

FIG. 8 illustrates one embodiment of the operational steps of pin control unit 102 for controlling a number of the input/output (I/O) pins 106 to perform general purpose I/O, and when used for driving address outputs, the output be driven strongly, and yet may be used for input within one state time, in compliant with an architectural requirement. As shown, at step 802, at reset or at the end of a bus cycle, pin control unit determines if a subsequent bus cycle is scheduled to begin immediately. If a subsequent bus cycle is scheduled to begin immediately, pin control unit causes the scheduled bus cycle to begin, step 804, e.g. performing the steps of FIGS. 4, 5 or 6. On the other hand, if a subsequent bus cycle is not scheduled to begin immediately, pin control unit causes the contents of the port register corresponding to the I/O pins of the I/O port to be inverted, step 806 and then stored into the addressable storage locations corresponding to the pull-up and the pull-down devices of the output buffers associated with the I/O pins of the I/O port, step 808. Next, pin control unit waits for one state time, step 810. At step 812, upon waiting for the required one state time, pin control unit causes a pair of control bit values to be stored into the addressable storage locations corresponding to the pull-up and pull-down devices of the output buffers associated with the I/O pins of the I/O port, to disable the pull-up and pull-down devices of the output buffers.

Whereas the above described embodiments have been selected for illustration to facilitate ease of understanding of the present invention, those skilled in the art will recognize that the present invention is not limited to these embodiments. Various modifications and alterations, within the spirit and scope of the appended claims, may be made. The above description is thus to be regarded as illustrative instead of restrictive on the present invention.

Accordingly, an adaptable method and apparatus for controlling I/O pins of an integrated circuit, and controlling I/O pins of a functional block of an integrated circuit has been disclosed.

What is claimed is:

1. An apparatus comprising:
    a plurality of addressable storage locations, the plurality of addressable storage locations comprising a plurality of sets of three addressable storage locations;
    a plurality of generic input/output (I/O) pins, each I/O pin to be coupled to three corresponding addressable storage locations, and responsive to bit values stored into the three corresponding addressable storage locations; and
    a pin control unit coupled to the plurality of addressable storage locations, said pin control unit to selectively store bit values in selected addressable storage locations in a first predetermined manner to cause the generic I/O pins to manifest a first set of I/O characteristics as defined in accordance with a first architecture.

2. The apparatus of claim 1 wherein the pin control unit is to further selectively store bit values in selected addressable storage locations in a second predetermined manner to cause the generic I/O pins to manifest a second set of I/O characteristics as defined in accordance with a second architecture.

3. The apparatus of claim 1 further comprising:
    a plurality of pairs of I/O buffers, each pair of I/O buffers of the plurality of pairs of I/O buffers coupled between one of the plurality of generic I/O pins and three corresponding addressable storage locations, said I/O buffers to input bit values from and/or output bit values to corresponding generic I/O pins responsive to the bit values stored in the corresponding addressable storage locations.

4. The apparatus of claim 3 wherein each pair of I/O buffers of the plurality of pairs of I/O buffers includes an input buffer and an output buffer.

5. The apparatus of claim 4 wherein a first output buffer includes a pull up device coupled to a first addressable memory location of the three corresponding addressable storage locations and a pull-down device coupled to a second addressable memory location of the three corresponding addressable storage locations, and wherein the pin control unit stores an output bit value into both the first and second addressable memory locations.

6. The apparatus of claim 4 wherein a first output buffer includes a pull up device coupled to a first addressable memory location of the three corresponding addressable storage locations and a pull-down device coupled to a second addressable memory location of the three corresponding addressable storage locations, and a first input buffer is coupled to a third addressable memory location of the three corresponding addressable storage locations, wherein the pin control unit stores a first value in the first addressable memory location and an inverse of the first value in the second addressable memory location to disable the output buffer, and wherein an input bit value from the first input buffer is stored in the third addressable memory location.

7. The apparatus of claim 1 wherein the plurality of generic I/O pins are coupled to one of an integrated circuit and a functional block of an integrated circuit.

8. The apparatus of claim 1 wherein the first architecture includes one of a multiplexed address and data protocol and a de-multiplexed parallel address and data protocol.

9. The apparatus of claim 3 further comprising:
    a plurality of de-multiplexers to couple an output buffer of each of the plurality of pairs of I/O buffers to output addressable storage locations of the plurality of addressable storage locations, said plurality of de-multiplexers to de-multiplex output bit values to respective I/O pins; and
    a plurality of multiplexers to couple an input buffer of each of the plurality of pairs of I/O buffers to input addressable storage locations of the plurality of addressable storage locations, said plurality of multiplexers to multiplex input bit values from respective I/O pins.

10. The apparatus of claim 3 wherein a first subset of the plurality of pairs of I/O buffers are coupled to a first set of three addressable storage locations, and a second subset of the plurality of pairs of I/O buffers are coupled to a second set of three addressable storage locations.

11. A method comprising:
    selecting certain generic input/output (I/O) pins of a plurality of generic I/O pins, each I/O pin to be coupled to three corresponding addressable storage locations; and
    storing bit values in selected addressable storage locations of a plurality of addressable storage locations corresponding to the certain generic I/O pins in a first predetermined manner to cause the certain generic I/O pins to manifest a first set of I/O characteristics as defined in accordance with a first architecture;
    wherein the plurality of addressable storage locations comprises a plurality of sets of three addressable storage locations.

12. The method of claim 11 further comprising:
    storing bit values in the selected addressable storage locations of the plurality of addressable storage locations corresponding to the certain generic I/O pins in a second predetermined manner to cause the certain generic I/O pins to manifest a second set of I/O characteristics as defined in accordance with a second architecture.

13. The method of claim 11 further comprising:

asserting the bit values stored in the selected addressable storage locations on a plurality of corresponding pairs of I/O buffers, wherein each pair of I/O buffers of the plurality of pairs of I/O buffers includes an input buffer and an output buffer.

14. The method of claim 13 wherein the asserting the bit values comprises:

storing an output bit value in both a first addressable memory location of the three corresponding addressable memory locations coupled to a pull-up device of a first output buffer and a second addressable memory location of the three corresponding addressable memory locations coupled to a pull-down device of the first output buffer.

15. The method of claim 13 wherein the asserting the bit values comprises:

storing a first bit value in a first addressable memory location of the three corresponding addressable memory locations coupled to a pull-up device of a first output buffer and an inverse of the first bit value in a second addressable memory location of the three corresponding addressable memory locations coupled to a pull-down device of the first output buffer to disable the first output buffer; and storing an input bit value from a first input buffer in a third addressable memory location of the three corresponding addressable memory locations.

16. The method of claim 11 wherein the plurality of generic I/O pins are coupled to one of an integrated circuit and a functional block of an integrated circuit.

17. The method of claim 11 wherein the first architecture includes one of a multiplexed address and data protocol and a de-multiplexed parallel address and data protocol.

18. The method of claim 11 further comprising:

de-multiplexing output bit values from an output addressable memory location of the plurality of addressable memory locations to a first set of the plurality of generic I/O pins; and multiplexing input bit values from a second set of the plurality of generic I/O pins to an input addressable memory location of the plurality of addressable memory locations.

19. The method of claim 13 wherein a first subset of the plurality of pairs of I/O buffers are coupled to a first set of three addressable storage locations, and a second subset of the plurality of pairs of I/O buffers are coupled to a second set of three addressable storage locations.

* * * * *